Jan. 8, 1957   M. J. CARLSON   2,776,768
TRACTOR MOUNTED TONG LOADER
Filed March 8, 1954   2 Sheets-Sheet 1
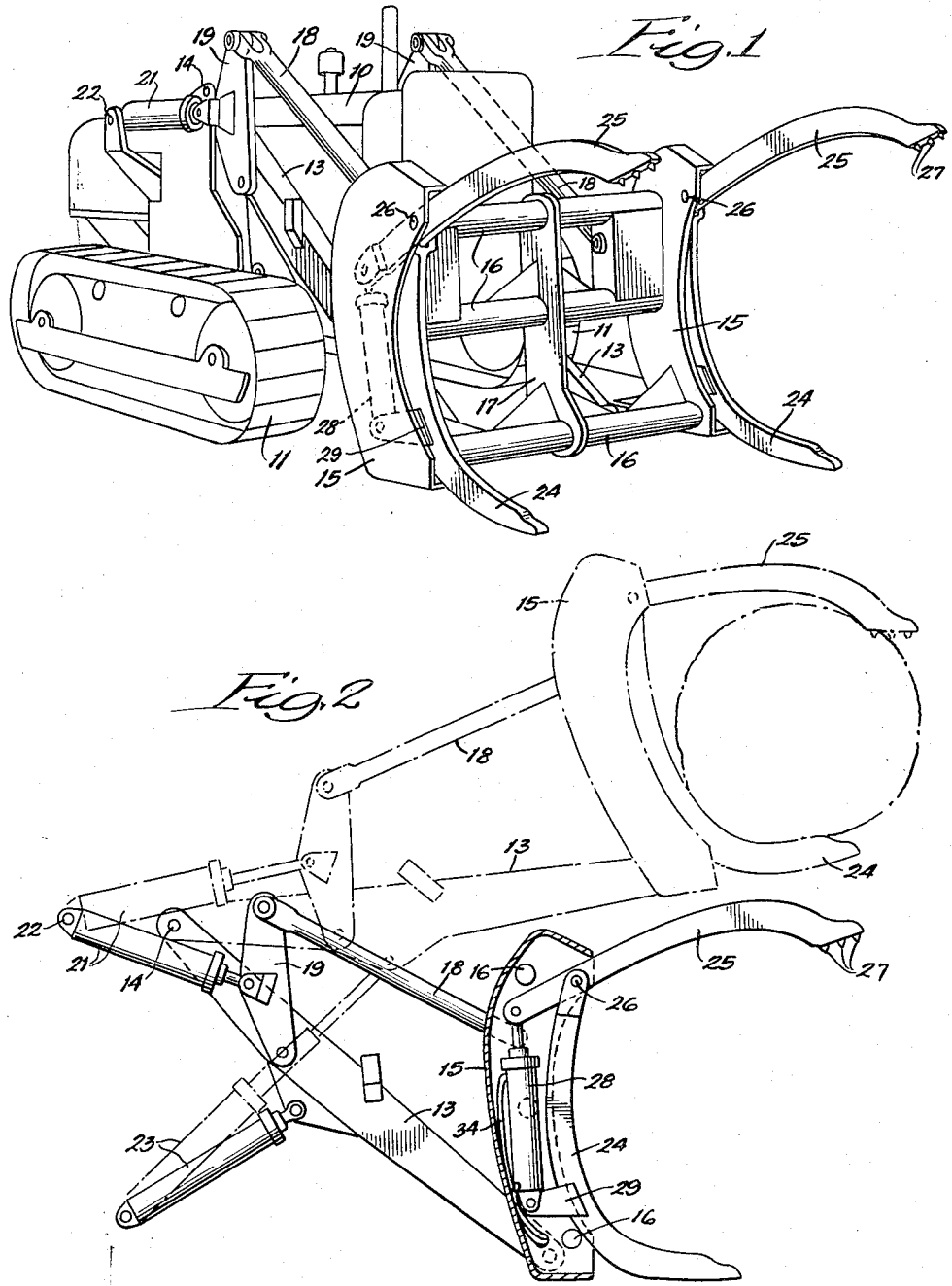
INVENTOR:
Marvin J. Carlson,
BY
ATTORNEYS.

Jan. 8, 1957 M. J. CARLSON 2,776,768
TRACTOR MOUNTED TONG LOADER
Filed March 8, 1954 2 Sheets-Sheet 2
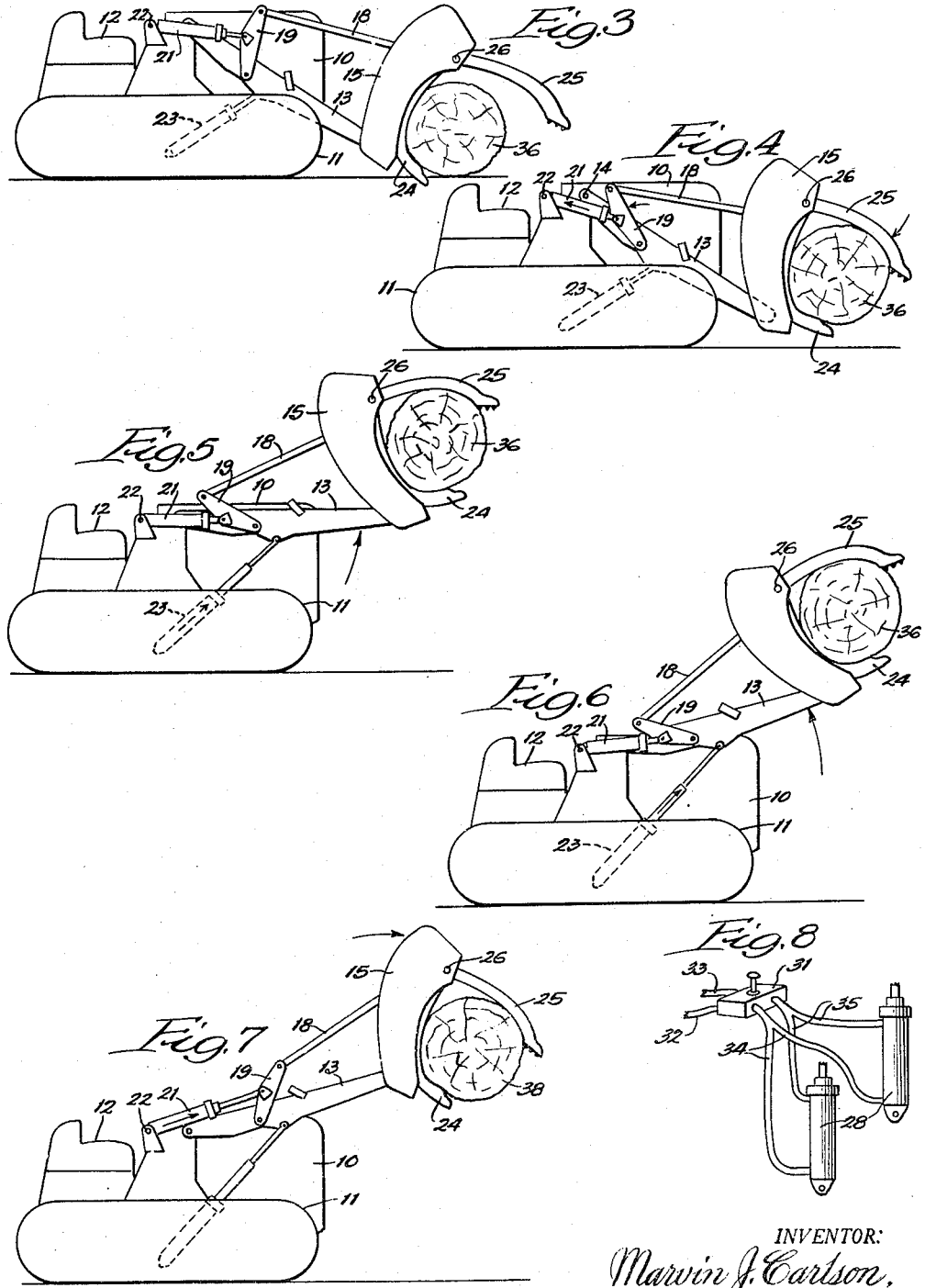
INVENTOR:
Marvin J. Carlson,
BY
ATTORNEYS.

United States Patent Office 2,776,768
Patented Jan. 8, 1957

2,776,768

TRACTOR MOUNTED TONG LOADER

Marvin J. Carlson, Grays Lake, Ill., assignor to Tractomotive Corporation, Deerfield, Ill., a corporation of Illinois Application March 8, 1954, Serial No. 414,584

4 Claims. (Cl. 214—147)

This invention relates to tractor mounted tong loaders, and more particularly to a tractor mounted unit for gripping and handling relatively large objects, such as logs.

Logs and the like have heretofore been handled largely by forks mounted on tractor vehicles which are slipped under the logs or other objects and then raised to pick them up and carry them. It is frequently difficult to get the forks under objects to be picked up, such as logs on a pile or which are partially buried, and it is also difficult to carry such objects over rough terrain and to load them properly on trucks or the like.

It is one of the objects of the present invention to provide a tractor mounted tong loader which operates to grip and pick up objects in substantially any position, to transport such objects safely and to deposit them easily and accurately at any desired point.

Another object is to provide a tractor mounted loader in which the object is gripped by tongs operated by a fluid motor controlled from the tractor.

According to one feature of the invention, the tongs are freely pivoted on a supporting frame carried by the tractor for vertical movement and for tilting about a horizontal axis and whose movements are controlled independently of operation of the tongs. The lower arms of thte tongs preferably engage the frame to limit swinging thereof toward the tractor so that the lower arms can be used to push objects or can be forced under objects.

A further object of the invention is to provide a tractor mounted loader including a plurality of sets of tongs operated by fluid motors connected in parallel so that the tongs are capable of relative movement but will exert the same gripping force.

The above and other objects and features of the invention will be more readily apparent from the following description when read in connection with thte accompanying drawing, in which Figure 1 is a perspective view of a tractor equipped with a tong loader embodying the invention;

Figure 2 is a side view with parts broken away of the loader mechanism;

Figures 3 to 7 are side elevations illustrating different positions of the loader relative to the tractor for different types of operations; and Figure 8 is a partial diagrammatic view illustrating the hydraulic operating mechanism for the tongs.

The loader of the present invention is adapted to be attached to any desired type of tractor. For purposes of illustration, there is shown a standard crawler tractor having a body 10 supported on crawler tracks 11 at its opposite sides. The tractor may be driven by an operator from a seat 12 at the rear of the tractor and can be controlled in any conventional manner. The tractor is also preferably equipped with one or more hydraulic pumps to supply operating fluid for operating the loader.

The loader itself comprises a linkage including a pair of main beams 13 pivoted on horizontal pivots 14 on opposite sides of the tractor body. The main beams 13 are pivotally connected at their forward ends to a supporting framework formed by a pair of hollow side members 15 which are vertically elongated and are pivoted to the forward ends of the beams 13 at their lower ends. The side members 15 are preferably open channels with the open sides of the channels facing forward and are rigidly connected by cross bars 16 which may be tied together at their centers by a vertical brace 17 to form a rigid supporting frame.

The angular position of the supporting frame relative to the beams 13 is controlled by links 18 pivoted to the upper parts of the side members 15 at their forward ends, and at their rearward ends pivoted to cross links 19. The cross links 19 are pivoted at their lower ends to the intermediate portions of the main beams 13 and at their upper ends to the rear ends of the control links 18. The central parts of the cross links are connected through expansible fluid motors 21 to fixed pivots 22 on the sides of the tractors spaced rearwardly from the pivots 14. The main beams 13 are adapted to be swung upward by fluid motors 23 connected to the beams intermediate their ends and to the tractor frame.

The fluid motors 21 and 23 may be supplied with operating fluid under pressure from the pump or pumps on the tractor under the control of conventional control valves not shown. When fluid is admitted to the lower ends of the motors 23 they will expand to the dotted line position shown in Figure 2, to elevate the linkage and the supporting frame. The angular position of the supporting frame is controlled by expansion of the motors 21 to tilt the supporting frame about its pivotal connection to the main beams. It will be understood that the motors 23 on opposite sides of the frame are controlled simultaneously so that the frame will be swung without twisting and that the motors 21 are also controlled simultaneously so that the frame will be turned without being twisted.

In order to grip objects to be loaded, such for example as logs, the supporting frame carries a plurality of sets of gripping tongs. As shown, two sets of gripping tongs are provided, each of which is carried by one of the side members 15 and which may be identical in construction and operation.

As best seen in Figures 1 and 2, each set of tongs comprises a lower tong arm 24 which is preferably curved forward at its lower end to project beyond the bottom of the frame side member 15 and which is bifurcated at its upper end to receive an upper tong arm 25. The tong arms are pivotally connected to each other and are pivotally mounted on the frame side members 15 by pivot pins 26 extending through the tong arms and the side member. The upper tong arm 25 curves downwardly and is preferably provided with a plurality of relatively sharp gripping projections 27 at its tip to assist in gripping relatively small objects.

The tong arms are adapted to be moved toward and away from each other without interfering with their freedom of pivoting on the supporting frame by extensible hydraulic motors 28. As shown in Figure 2, one end of each motor 28 is pivotally connected to a bracket 29 secured to the lower arm 24 and the opposite end of the motor is secured to an extension of the upper arm 25 which projects beyond the pivot 26. The motors 28 are preferably double acting and when they are retracted as shown in Figure 2, will swing the arms apart to receive a load. When the motors 28 are extended they will swing the arms together while allowing them to pivot freely about the axis 26 as a unit.

As shown in Figure 8, the motors 28 are adapted to be controlled by a 4-way control valve 31 connected to a source of fluid under pressure through a conduit 32 and a sump through a conduit 33. The lower ends of both motors 28 are connected in parallel to one port of the valve through hoses or the like 34, and the upper ends of the motors are connected in parallel to the other valve port through hoses 35. When the valve is moved in one direction to connect the conduits 35 to the pressure source and the conduits 34 to exhaust, both motors will be retracted simultaneously to open both sets of tongs. When the valve is thrown in the opposite direction, fluid will be supplied to the lower ends of both motors to expand them to grip a load. In gripping objects such as logs or the like which may taper, it will be apparent that one set of tongs must close to a greater extent than the other, and that both sets of tongs should exert the same gripping force. With the arrangement as shown in Figure 8, this is accomplished since the pressure acting on each of the motors 28 is the same and since the motors 28 and the tongs to which they are connected can move relative to each other.

Figures 3 to 7 show different positions of the loader in handling an object such as a relatively large log shown at 36. With the log resting on relatively level ground it may be picked up by the tongs with the parts in the position shown in Figure 3. In this position, the motors 28 are retracted to open the tongs, the motor 21 is partially extended to tilt the supporting frame forward, and the motor 23 is retracted to lower the supporting frame.

With the parts in this position the tractor may be driven toward the log until the lower tong arms 24 abut the adjacent side of the log as shown. It will be seen that if pressure is placed on the lower arms 24 they will engage the supporting frame when the lower portions thereof engage the lower cross member 16 which preferably extends through the hollow side members 15 as shown in Figure 2. Therefore, the log can, if desired, be pushed or rolled and substantial pressure may be exerted on it to loosen it in the event it is frozen to the ground or otherwise difficult to release.

With the lower tong arms substantially in the position shown in Figure 3, the motors 28 may be extended to swing the upper tong arms 25 downward into gripping engagement with the log. At this time the log may be picked up for carrying or loading or other handling. Figure 4 illustrates the initial step in picking up a log so gripped by the tongs which preferably consists in retracting the motor 21 to rock the supporting frame backward toward the tractor. This rocking action will elevate the log substantially to the position shown in Figure 4, and will move it closer to the tractor so that the force tending to tip the tractor forward will be minimized. For carrying the log is preferably raised to approximately the position shown in Figure 5 by extending the motor 23. In this position, the log is relatively close to the tractor and is firmly held by the tongs so that it can be carried as desired without danger of losing the log or of tipping the tractor over.

The log may be elevated still further to the position shown in Figure 6 by extending the motor 23 to its maximum extent. In this position, the log is held at the relatively high elevation, as high as the top loading position of a normal truck. It may also be desirable under some conditions to transport logs in the position of Figure 6 since they are easily held in this position with their weight close to the front end of the tractor.

For unloading the supporting frame is preferably brought forward to the position shown in Figure 7, by extending the motors 21. In this position the tongs hang downward from their supporting pivots 26 but still grip the log securely so that it will not be released until the tongs are open. With the log in the desired position as, for example, in the proper alignment over a truck body or a pile of logs, the tongs may be opened to release the log which will roll easily therefrom by gravity. In loading extremely large logs whose weight might be sufficient to tilt the tractor forward in the position of Figure 7, the supporting framework may first be rested on the truck body or on other logs before it is swung forward to the position of Figure 7 so that at least a portion of the weight will be taken by the truck body or the other logs and the tractor will not be tipped over.

It will be apparent that the loading mechanism of the present invention can handle many types of objects other than large logs. For example, small logs may be individually gripped between the tips of the tong arms for which purpose the sharpened projections 27 are provided. The lower tong arm is also preferably formed with a short section of small radius near its tip for gripping small objects. Alternatively a plurality of smaller logs may be gripped in the tongs simultaneously for simultaneous handling and loading. It is also possible to pick up various other types of objects, such as slabs, large stones, tile, pipe and the like, and to move them efficiently and safely. Therefore, while one embodiment of the invention has been shown and described in detail, it will be understood that this is illustrative only and is not to be taken as a definition of the scope of the invention, reference being had for this purpose to the appended claims.

What is claimed is:

1. A tractor mounted tong loader comprising a carrying frame, means to mount the frame on a tractor for bodily swinging in a vertical plane and for turning about a horizontal axis transverse to the tractor and motor means to elevate the frame and motor means connected to the mounting means to turn the frame relative to the mounting means and the tractor about the horizontal axis, a pair of curved tong arms pivotally connected to each other and to the frame on a common axis transverse to the tractor and both freely pivotal relative to the frame, and a motor directly interconnecting the tong arms to move them toward each other to grip an object.

2. A tractor mounted tong loader comprising a carrying frame, means to mount the frame on a tractor for bodily swinging in a vertical plane and for turning about a horizontal axis transverse to the tractor and motor means to elevate the frame and motor means connected to the mounting means to turn the frame relative to the mounting means and the tractor about the horizontal axis, upper and lower tong arms pivotally connected to each other and to the frame on a common horizontal axis transverse to the tractor and both freely pivotal relative to the frame, a part on the frame engageable with the lower tong arm to limit swinging thereof toward the frame, and a motor directly interconnecting the tong arms to move them toward each other.

3. A tractor mounted tong loader comprising a carrying frame, means to mount the frame on a tractor for bodily swinging in a vertical plane and for turning about a horizontal axis transverse to the tractor, motor means to elevate the frame, motor means connected to the mounting means to turn the frame relative to the mounting means and the tractor about the horizontal axis, a plurality of pairs of curved tong arms, the arms of each pair being pivoted to each other and the pairs of arms being pivoted to the frame on spaced coaxial horizontal axes transverse to the tractor, all of the arms being freely pivotal relative to the frame, and separate motors directly interconnecting the arms of the pairs respectively to move the arms toward each other to grip objects.

4. A tractor mounted tong loader comprising a carrying frame, means to mount the frame on a tractor for bodily swinging in a vertical plane and for turning about a horizontal axis transverse to the tractor, motor means to elevate the frame, motor means connected to the mounting means to turn the frame relative to the mounting means and the tractor about the horizontal axis, a plurality of pairs of curved tong arms, the arms of each pair being pivoted to each other and the pairs of arms being pivoted to the frame on spaced coaxial horizontal axes transverse to the tractor, all of the arms being freely pivotal relative to the frame, a separate hydraulic motor directly interconnecting the arms of each pair to move them together, and a common control valve for the motors connected in parallel thereto to cause the motors to move simultaneously and to be capable of movement independent of each other.

References Cited in the file of this patent

UNITED STATES PATENTS

| | | |
|---|---|---|
| 1,346,160 | Barlow | July 13, 1920 |
| 1,490,235 | Smith et al. | Apr. 15, 1924 |
| 1,763,351 | Gfrorer | June 10, 1930 |
| 2,488,767 | Drott et al. | Nov. 22, 1949 |
| 2,587,769 | Rowe | Mar. 4, 1952 |